United States Patent [19]

Ross et al.

[11] Patent Number: 5,758,904
[45] Date of Patent: Jun. 2, 1998

[54] SYSTEM AND METHOD FOR SECURING A BLOCK TO A MANIFOLD FOR A HEAT EXCHANGER

[75] Inventors: Gary R. Ross, Ann Arbor, Mich.; James Bacoccini, Toledo, Ohio

[73] Assignee: Livernois Research & Development Co., Dearborn, Mich.

[21] Appl. No.: 661,103

[22] Filed: Jun. 10, 1996

[51] Int. Cl.$^6$ .................................................... F16L 55/00
[52] U.S. Cl. ............................ 285/23; 285/133.1; 285/189; 285/288.5; 285/906; 228/44.3; 228/139; 228/212
[58] Field of Search ........................ 285/197, 208, 285/209, 210, 286, 23, 287, 156, 189, 133.1, 288.5, 906; 165/173, 178; 29/890.039, 890.043, 890.052, 890.148; 228/44.3, 131, 132, 139, 212

[56] References Cited

U.S. PATENT DOCUMENTS

| | | |
|---|---|---|
| 968,711 | 8/1910 | Stevenson . |
| 2,421,596 | 6/1947 | Bruce et al. . |
| 3,981,061 | 9/1976 | Jackson ........................ 285/197 X |
| 4,320,911 | 3/1982 | Wood . |
| 4,615,098 | 10/1986 | Côme et al. . |
| 4,856,824 | 8/1989 | Clausen ........................ 165/173 X |
| 5,280,971 | 1/1994 | Tokutake et al. ............. 285/197 X |
| 5,330,154 | 7/1994 | Mashburn et al. . |
| 5,379,834 | 1/1995 | Tokutake ...................... 165/178 |
| 5,407,004 | 4/1995 | DeRisi et al. . |
| 5,526,605 | 6/1996 | O'Dougherty ............... 285/209 X |

FOREIGN PATENT DOCUMENTS

| | | | |
|---|---|---|---|
| 839603 | 4/1970 | Canada ........................ 285/197 |
| 5277714 | 12/1993 | Japan ........................... 165/173 |

Primary Examiner—Dave W. Arola
Attorney, Agent, or Firm—Brooks & Kushman P.C.

[57] ABSTRACT

A block adapted to be joined to a manifold for a heat exchanger by brazing or an equivalent method includes a block body having a protrusion. The block body has an engagement surface to be deployed in cooperation with the outer surface of the manifold. The protrusion extends from the engagement surface, and includes a neck and a flange extending from the neck. The flange is sized so as to be inserted through a locating aperture in the manifold. The neck is sized so as to define an annular space between the neck and the aperture when the flange is inserted through the aperture. The block body is peripherally movable with respect to the manifold toward a secured position, after insertion. The flange engages the inner surface of the manifold and secures the block to the manifold in the secured position prior to joining the block thereto.

20 Claims, 4 Drawing Sheets

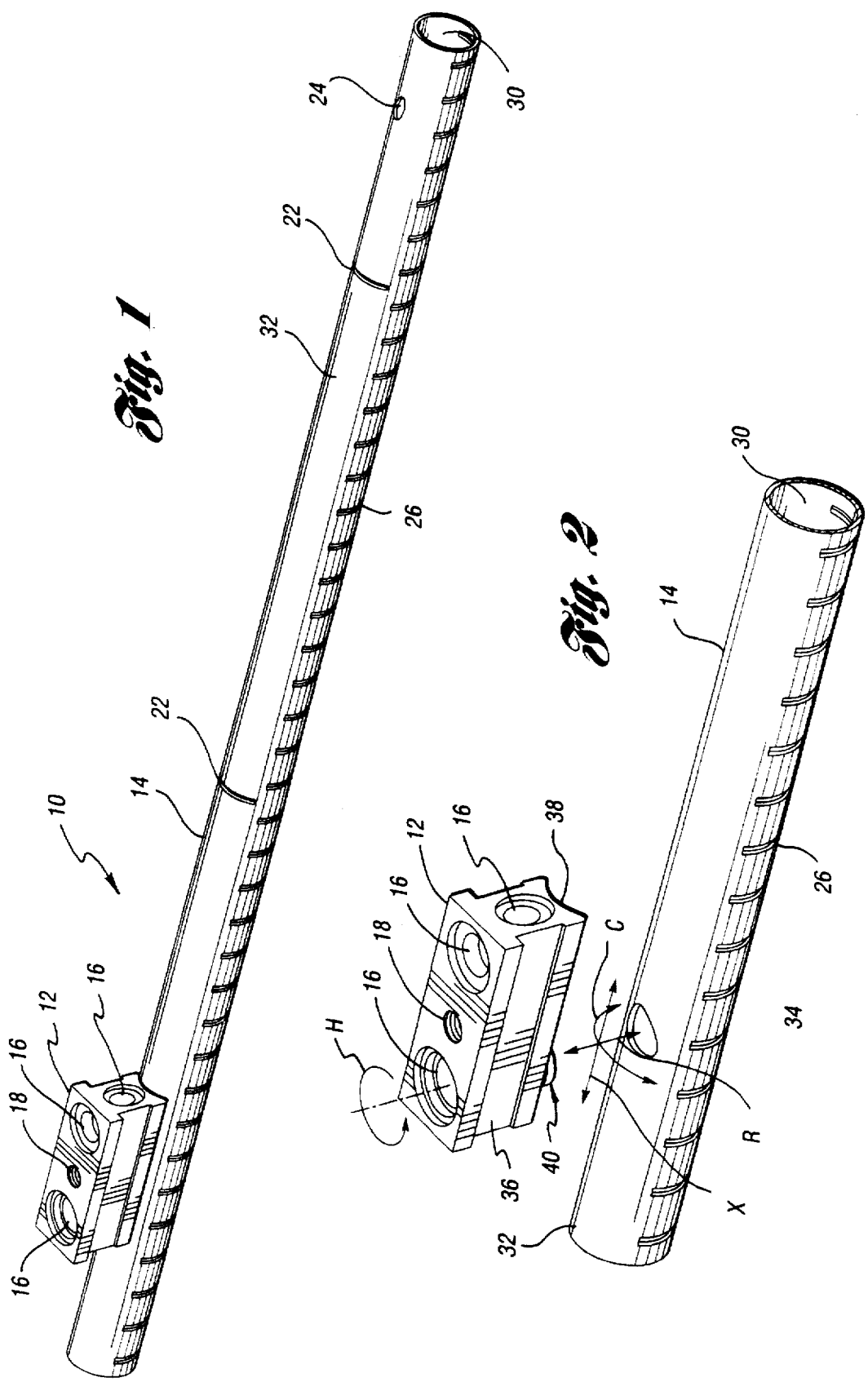

SYSTEM AND METHOD FOR SECURING A BLOCK TO A MANIFOLD FOR A HEAT EXCHANGER

TECHNICAL FIELD

This invention relates to a system and method for securing a block to a manifold for a heat exchanger before and during the step of joining the block and manifold by furnace brazing or an equivalent process.

BACKGROUND ART

The component parts of an assembly to be furnace brazed must be assembled in an essentially fixed position relative to each other before entering the furnace. They must be capable of maintaining this position throughout brazing and cooling. Today's industries which manufacture aluminum heat exchangers often find it difficult to hold attaching parts in place while the parts go through the braze process. Many temporarily attached or jigged parts lose their correct orientation due to their inability to maintain fixed contact with each other, which increases the risks of leakage and misaligned parts. This may be exacerbated if the parts have different coefficients of thermal expansion.

Conventionally, the mounting blocks or port blocks through which a fluid flows in a heat exchanger are gravity-located. That is, a locator pin or pipe protrudes from the block, and is aligned with an aperture on the manifold. During assembly, the block is placed on the manifold. The block may be further secured for brazing by wrapping a wire around the two parts.

A primary disadvantage of existing systems and methods of assembly for blocks and manifolds and other heat exchanger components is that when the attached parts are heated in the furnace, the securing wire may expand more than the components. The block then has a tendency to tilt on the manifold, and resultingly move out of the proper orientation before completion of the brazing process. This misalignment of components causes leaks in the brazed assembly, and the leaking parts must be scrapped. Further, misalignment of the block when brazed to the manifold is a problem when attempting to secure components to the block. The heat exchanger components to be fitted to the block cannot be properly connected if the block is not correctly aligned.

Typical methods of securing the parts together are impractical because there is inadequate space to provide conventional jigging or fixturing where the parts are to be joined. Further, because of heat expansion that occurs within the furnace, conventional methods such as an interference, fit or staking will be insufficient to secure the parts.

SUMMARY OF THE INVENTION

It is, therefore, an object of the present invention to provide an improved system and method for securing a block to a manifold for a heat exchanger prior to joining the block and manifold by a brazing process.

It is another object of the present invention to provide a system and method for securing a block to a manifold for a heat exchanger that reduces the amount of scrapped parts during production.

In carrying out the above objects and other objects and features of the present invention, a block adapted to be joined to a manifold for a heat exchanger by brazing or an equivalent method is provided. The block includes a block body having an engagement surface to be deployed in cooperation with an outer surface of the manifold. A protrusion extends from the engagement surface. The protrusion has a neck, and a flange extends from the neck. The flange is sized so as to be radially insertable through an aperture in the manifold. The neck is sized so as to define an annular space between the neck and the aperture when the flange is inserted through the aperture.

The block body is axially movable with respect to the manifold toward a secured position. When the block is in the secured position, the flange engages an inner surface of the manifold, and radially secures the block to the manifold. The block is moved to the secured position prior to placing the parts in the brazing furnace.

In one embodiment, the engagement surface of the block body is concave, and the outer surface of the manifold includes a convex portion. The block and manifold surfaces cooperate so as to urge the block and the manifold into axial alignment.

In a preferred construction, the block body defines a bore through which a coolant may pass, and a pipe formed of rolled sheet material is received in the bore. An end of the pipe protrudes from the block body for alignment with the aperture on the manifold. The pipe is sized so as to produce an interference fit between the pipe and the bore, thereby securing the pipe within the bore. The flange is formed by pressing the end of the pipe. The sheet material is cladded prior to rolling, preferably on both sides, with brazing filler metal for providing additional sealing material during brazing.

The advantages accruing to the present invention are numerous. For example, the system and method of the present invention reduces the amount of assemblies that must be scrapped due to leaking or misaligned parts.

The above objects, and other objects, features and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 1 is a perspective view of a block and manifold assembly made in accordance with the present invention;

FIG. 2 is an exploded perspective view of the block and manifold assembly of FIG. 1;

BEST MODES FOR CARRYING OUT THE INVENTION

Figure 3:
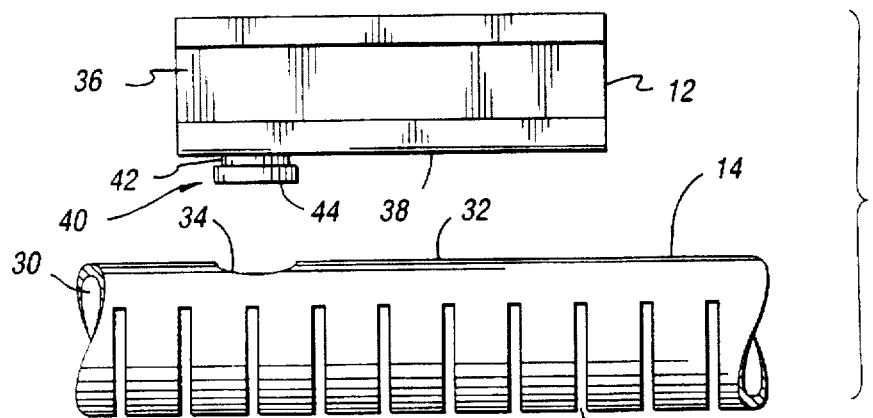
FIG. 3 is a side elevation showing the block and the manifold prior to assembly in accordance with the present invention.

Referring to FIG. 1, a block and manifold assembly made in accordance with the present invention is generally indicated at 10. A block 12 is secured to a manifold 14 in a manner which will be described. Block 12 has a plurality of ports 16 for accommodating fluid flow and for mounting other heat exchanger components. Threaded hole 18 may also be used to mount other components of the heat exchanger. Slot 22, aperture 24, and slots 26 of manifold 14 are provided for assembling the various components of the heat exchanger such as baffles, not specifically shown.

Referring to FIG. 2, elongate manifold 14 has an inner surface 30 and an outer surface 32. Manifold 14 has an aperture 34 for locating block 12. Block 12 includes a block body 36 having an engagement surface 38 shaped to cooperate with manifold outer surface 32. The cooperating surfaces are contoured to urge the parts into axial alignment along the X-axis (FIG. 2), and to prevent rotation with respect to one another as indicated by arrow H. A rod member or protrusion 40 may be either a pin or a pipe 80 (FIG. 10) received within a bore 86 (FIG. 12) of block body 36, and block body 36 may be formed of extruded aluminum. Alternatively, protrusion 40 may be formed integrally with block body 36. Protrusion 40 has a neck 42 and a flange 44 extending from neck 42.

Figure 4:
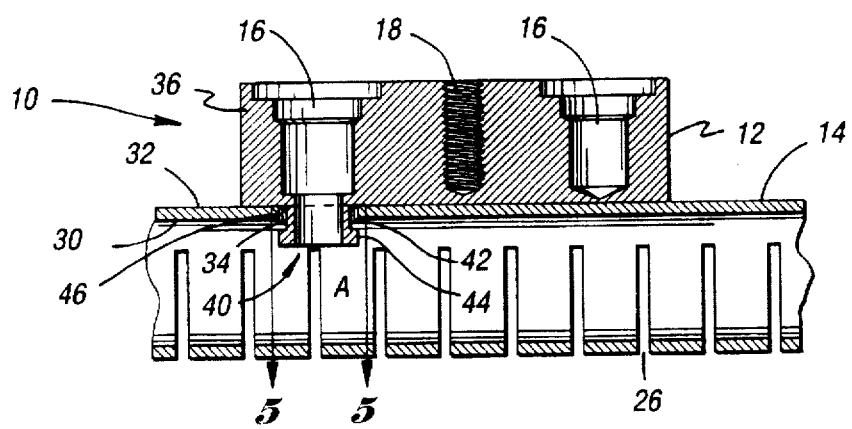
FIG. 4 is a cross-sectional view showing the flange inserted through the aperture of the manifold.
Figure 5:
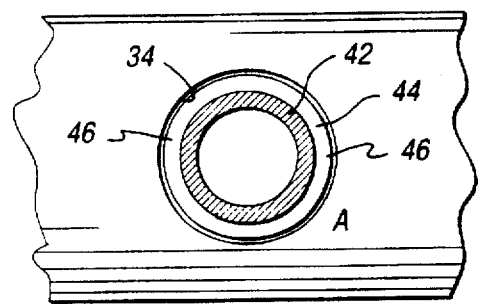
FIG. 5 is a cross-sectional view taken along line 5—5. of FIG. 4 showing the annular space between the neck of the protrusion and the aperture of the manifold prior to axial displacement of the block in relation to the manifold.
Figure 6:
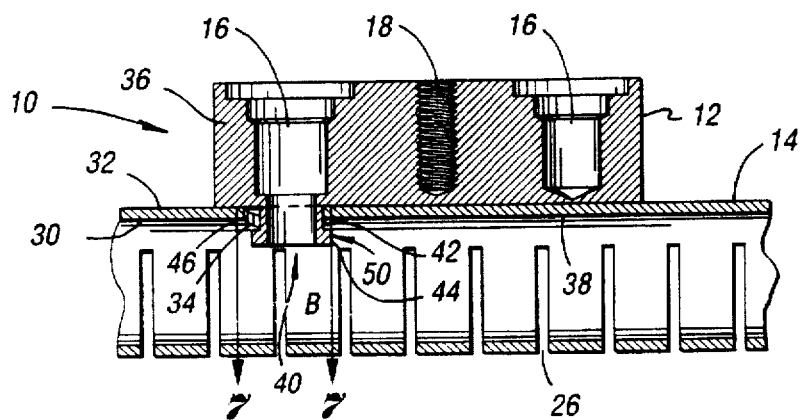
FIG. 6 is a cross-sectional view showing the block axially displaced in relation to the manifold.
Figure 7:
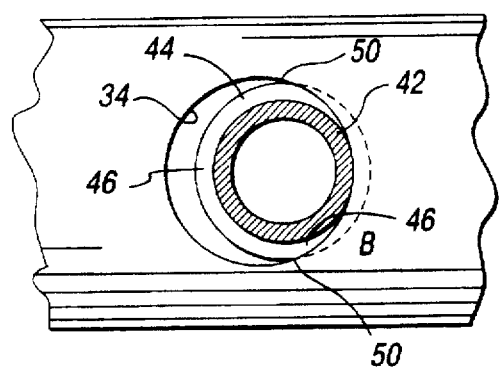
FIG. 7 is a cross-sectional view taken along line 7—7 of FIG. 6 showing the neck of the protrusion and the aperture of the manifold when the block is in the secured position.
Figure 8:
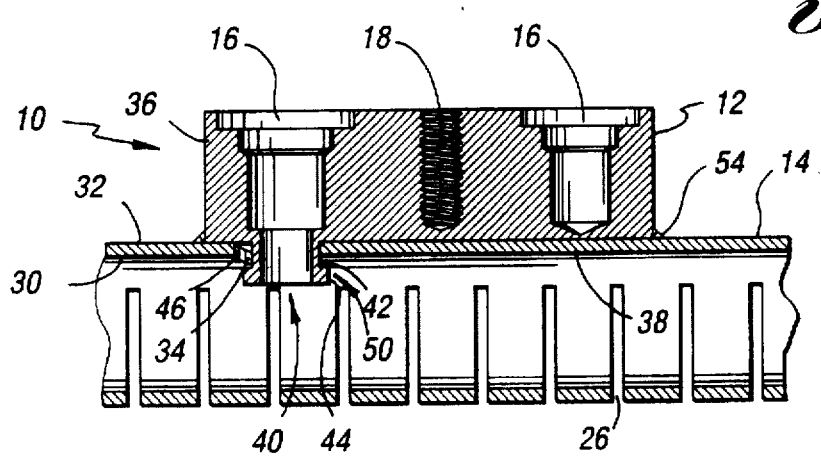
FIG. 8 is a cross-sectional view showing the block brazed to the manifold.

Turning now to FIGS. 2–8, block 12 and manifold 14 are shown at the different stages of assembly. Flange 44 is sized so as to be radially insertable parallel to the R-axis through aperture 34 (FIG. 2). Neck 42 is sized so as to define an annular space 46 (FIG. 5) between neck 42 and aperture 34 when the flange 44 has been radially inserted through aperture 34. Annular space 46 allows only constrained peripheral movement (in relation to the C and X axes) of block body 36 with respect to manifold 14. Block body 36 is axially movable parallel to the X-axis with respect to manifold 14 from an inserted position indicated at A (FIG. 5) toward a secured position indicated at B (FIG. 7). Flange 44 engages manifold inner surface 30 when in the secured position B. The contacting surfaces of flange 44 and manifold inner surface 30 are generally indicated at 50 (FIGS. 6, 8). As best shown in FIGS. 4 and 6, flange 44 extends perpendicularly from neck 42 and block body 36 is moved axially (FIG. 2), as indicated by arrow X, along the periphery of an elongate portion of the manifold 14 from position A to secured position B. Alternatively, flange 44 may extend from neck 42 so that block body 36 may be moved circumferentially (FIG. 2), as indicated by arrow C, along the periphery of manifold 14 to a secured position.

Figure 10:
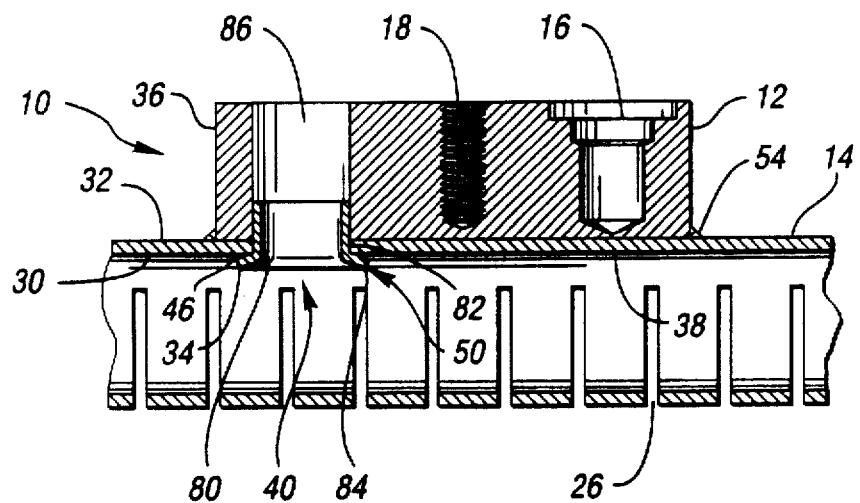
FIG. 10 is a cross-sectional view similar to FIG. 8, illustrating another embodiment of the present invention.
Figure 11:
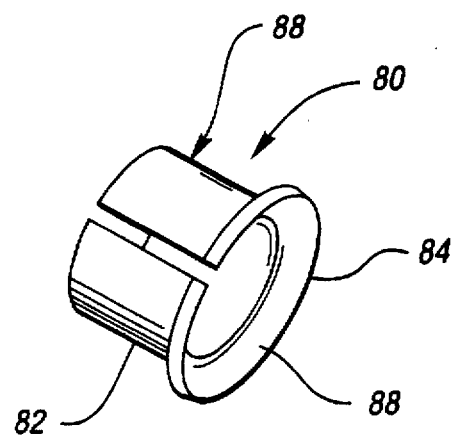
FIG. 11 is a perspective view of a pipe formed of rolled sheet material in accordance with the present invention.

With reference to FIGS. 10 and 11, in one embodiment, protrusion 40 is defined by a pin 80 received in a bore 86 of block body 36. An end of the pin 80 extends beyond engagement surface 38 to define protrusion 40 having a neck 82 and flange 84. The pin 80 is sized so as to produce an interference fit between the pin 80 and the bore 86, thereby securing the pin 80 within the bore 86. The pin 80 may define a conduit therethrough for accommodating fluid flow, or may be a solid pin (not specifically illustrated).

In a preferred embodiment, the pin is constructed as a pipe 80 (FIG. 11) formed of rolled sheet material which is received in the bore 86. Protrusion 40 is defined by an end of the pipe 80. The pipe 80 is sized so as to produce an interference fit between the pipe 80 and the bore 86, thereby securing the pipe 80 within the bore 86. Flange 44 is an annular flange formed by pressing the end of the pipe 80. The sheet material is preferably a clad brazing sheet, cladded on both sides for providing additional sealing material during brazing, as specifically shown in FIG. 11 at reference numeral 88.

Each cladding layer has a thickness that ranges from about 2% to about 10% of the sheet thickness of neck 42. The cladding thickness preferably ranges from 5% to 10% of the sheet thickness. The cladding material has a lower melting point than the base alloy of the sheet material. For example, the sheet material may be 3003 aluminum alloy. In this case, a cladding material such as 4043 aluminum alloy, 4004 aluminum alloy, or an aluminum alloy in the 47XX series would perform satisfactorily.

Referring to FIG. 8, brazing material 54 is shown around block 12. While in the furnace, the brazing filler material 54 flows to areas of greatest curvature, such as the contacting surface indicated at 50 between flange 44 and manifold inner surface 30. The brazing material creates a metallurgical bond between the parts. It is advantageous to use a cladded rolled sheet metal pipe to form protrusion 40 because the cladding acts as brazing filler material to prevent leaks at the connection. Without a cladded protrusion, the cladding on the manifold is relied on to prevent leakage in the completed assembly.

With continuing reference to FIGS. 4–8, the peripheral movement of block 12 from the inserted position indicated at A (FIG. 5) to the secured position indicated at B (FIG. 7) will be further described. When flange 44 is inserted (FIG. 5) into aperture 34, annular apace 46 is shown to be coaxial with flange 44. When block 12 is secured (FIG. 7), flange 44 overlaps annular space 46 and neck 42 engages the manifold 14, the space 46 is crescent shaped.

Figure 9:
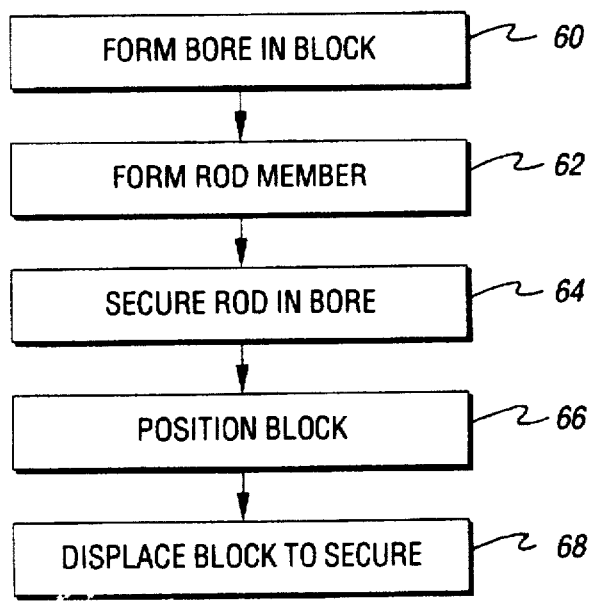
FIG. 9 is a process diagram illustrating a method for securing a block to a manifold for a heat exchanger in accordance with the present invention.

Referring now to FIG. 9, a method of securing block 12 to manifold 14 prior to and during brazing block 12 to manifold 14 is illustrated. At step 60, a bore is formed in block body 36, the bore extending through engagement surface 38. At step 62, a rod member 40, which is preferably a pipe 80 formed of rolled sheet material having a neck 82 and a flange 84 is formed. At step 64, the rod member is secured in the bore 86. The neck 82 protrudes from block body 36. The flange 84 is located outboard of block body 36 when rod member 40 is secured. At step 66, block body 36 is positioned in relation to the manifold 14. Engagement surface 38 cooperates with manifold outer surface 32 so that rod member 40 extends through aperture 34 into manifold 14. Also at step 66, block 12 is axially displaced with respect to manifold 14 into a secured position indicated at B (FIGS. 6 and 7) and flange 44 engages manifold inner surface 34 to radially secure block 12 to manifold 14 in the secured position B prior to and while brazing the block to the manifold.

It should be appreciated that the above described system and method could be utilized in any conventional process for joining a block to a manifold of the type in which the parts are secured together prior to joining. However, the advantages of the present invention are apparent when the parts are furnace brazed.

It is to be understood, of course, that while the forms of the invention described above constitutes the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. In combination with an elongate manifold for a heat exchanger, the manifold having an inner surface and an outer surface, and the manifold defining an aperture, an elongate block positioned to be joined to the manifold, the block comprising:

a block body having an engagement surface deployed in cooperation with the outer surface of the manifold; and a protrusion extending from the engagement surface, the protrusion having a neck and a flange extending from the neck.

wherein the flange is smaller in diameter than the diameter of said aperture and is inserted through the aperture, the neck and the aperture defining a space therebetween, and the flange engaging the inner surface of the manifold upon relative movement therebetween to secure the block to the manifold prior to joining the block against movement relative thereto.

2. The combination of claim 1 wherein the engagement surface of the block body is concave, and the outer surface of the manifold includes a convex portion for cooperating with the engagement surface of the block body so as to bias the block and the manifold into axial alignment.

3. The combination of claim 1 wherein the block body defines a bore, and the protrusion comprises:

a pin, the pin being received in the bore, an end of the pin extending beyond the engagement surface of the block body, and the pin being sized so as to produce an interference fit between the pin and the bore within the block, thereby securing the pin to the block body.

4. The combination of claim 3 wherein the pin defines a conduit for fluid flow therethrough.

5. The combination of claim 1 wherein the block body defines a bore, and the protrusion comprises:

a pipe formed of rolled sheet material, the pipe being received in the bore, an end of the pipe extending beyond the engagement surface of the block body, and the pipe being sized so as to produce an interference fit between the pipe and the bore within the block, thereby securing the pipe to the block body.

6. The combination of claim 5 wherein the flange is formed by pressing the end of the pipe.

7. The combination of claim 5 wherein the sheet material is cladded.

8. An elongate block for joining to a manifold of a heat exchanger, the manifold having an inner surface and an outer surface, the manifold defining an aperture, the block comprising:

a block body having an engagement surface to be deployed in cooperation with the outer surface of the manifold; and a protrusion extending from the engagement surface, the protrusion having a neck and a flange extending from the neck, wherein the flange is smaller in diameter than the diameter of said aperture and is inserted through the aperture, the neck and the aperture defining a space therebetween, and the flange engaging the inner surface of the manifold upon relative movement therebetween to secure the block to the manifold prior to joining the block against movement relative thereto.

9. The block of claim 8 wherein the flange extends perpendicularly from the neck.

10. The block of claim 8 wherein the engagement surface of the block body is concave, and the outer surface of the manifold includes a convex portion for cooperating with the engagement surface of the block body so as to bias the block and the manifold into axial alignment.

11. The block of claim 8 wherein the block body defines a bore, and the protrusion comprises:

a pin, the pin being received in the bore, an end of the pin extending beyond the engagement surface of the block body, and the pin being sized so as to produce an interference fit between the pin and the bore within the block, thereby securing the pin to the block body.

12. The block of claim 11 wherein the pin defines a conduit for fluid flow therethrough.

13. The block of claim 8 wherein the block body defines a bore, and the protrusion comprises:

a pipe formed of rolled sheet material, the pipe being received in the bore, an end of the pipe extending beyond the engagement surface of the block body, and the pipe being sized so as to produce an interference fit between the pipe and the bore within the block, thereby securing the pipe to the block body.

14. The block of claim 13 wherein the flange is formed by pressing the end of the pipe.

15. The block of claim 13 wherein the sheet material is cladded.

16. In a process for forming a heat exchanger wherein a block is joined to an elongate manifold, the manifold having an inner surface and an outer surface, the manifold defining an aperture, the block including a block body having an engagement surface to be deployed in cooperation with the outer surface of the manifold, a method for securing the block to the manifold, the method comprising the steps of:

forming a bore in the block body, the bore extending through the engagement surface of the block body;

forming a rod member having a neck and a flange extending from the neck, the flange being sized so as to be insertable through the aperture, the neck being sized so as to define a space between the neck and the aperture;

securing the rod member in the bore, the neck protruding from the block body, the flange being located outboard of the block body when the rod member is secured;

positioning the engagement surface of the block body adjacent to the outer surface of the manifold so that the rod member extends through the aperture in the manifold; and securing the block body to the manifold by axially displacing the block body with respect to the manifold into a secured position wherein the flange engages the inner surface of the manifold and secures the block to the manifold prior to joining the block against movement relative thereto.

17. The method of claim 16 wherein the engagement surface of the block body is concave, and the outer surface of the manifold includes a convex portion for cooperating with the engagement surface of the block body so as to bias the block and the manifold into axial alignment.

18. The method of claim 16 wherein the rod member is a pipe, and the step of forming a rod further comprises:

forming a pipe by rolling sheet material; and forming the flange by pressing an end of the pipe.

19. The method of claim 18 wherein the pipe is sized so as to produce an interference fit between the pipe and the bore.

20. The method of claim 18 wherein the sheet material is cladded.

* * * * *